US005517487A

United States Patent [19]
Fridland et al.

[11] Patent Number: 5,517,487
[45] Date of Patent: May 14, 1996

[54] SYSTEM FOR INCREASING THE CAPACITY OF EXISTING LOCAL AREA NETWORKS THAT USE SHIELDED TWISTED WIRE PAIR MEDIUM

[75] Inventors: Anatoly V. Fridland, North Andover, Mass.; John J. Finnegan, Hudson; David J. Holigan, Atkinson, both of N.H.

[73] Assignee: Modicon, Inc., North Andover, Mass.

[21] Appl. No.: 93,212

[22] Filed: Jul. 19, 1993

[51] Int. Cl.$^6$ .............................. H04L 5/20; H04L 12/28
[52] U.S. Cl. .............................. 370/5; 370/69.1; 370/124; 370/85.1
[58] Field of Search .............................. 370/5, 85.1, 69.1, 370/124, 85.2, 85.3, 82.5, 85.4, 110.4, 37; 375/36

[56] References Cited

U.S. PATENT DOCUMENTS

| | | | |
|---|---|---|---|
| 4,380,060 | 4/1983 | Wilhelm | 370/5 |
| 5,243,623 | 9/1993 | Murdock | 375/36 |
| 5,283,789 | 2/1994 | Gunnarsson et al. | 370/124 |

Primary Examiner—Wellington Chin
Attorney, Agent, or Firm—Ware, Fressola, Van Der Sluys & Adolphson

[57] ABSTRACT

The data communication capacity of an existing local area network (LAN) 10 that uses a shielded twisted wire pair 16 as its transmission medium may be increased with the addition of special frequency selective terminators 36 and single-ended transceivers 20. The single-ended transceivers 20 have two single-ended transmitter connections 42,44 to the two twisted wires 22,24 in the shielded twisted wire pair medium 16, respectively, and one single-ended receiver connection 46 to one of the two twisted wires 22,24 in the shielded twisted wire pair medium 16. The shielded twisted wire pair medium 16 is terminated by the special frequency selective terminators 36 which provide transmission line impedance matching over the signal bandwidth of a single-ended data channel, while providing a high impedance over the signal bandwidth of a differential data channel. Thus, differential data communications are allowed over the signal bandwidth of the differential data channel, while single-ended data communications are allowed over the signal bandwidth of the single-ended data channel, thereby increasing the overall data communication capacity of the LAN.

16 Claims, 3 Drawing Sheets

FIG. 2
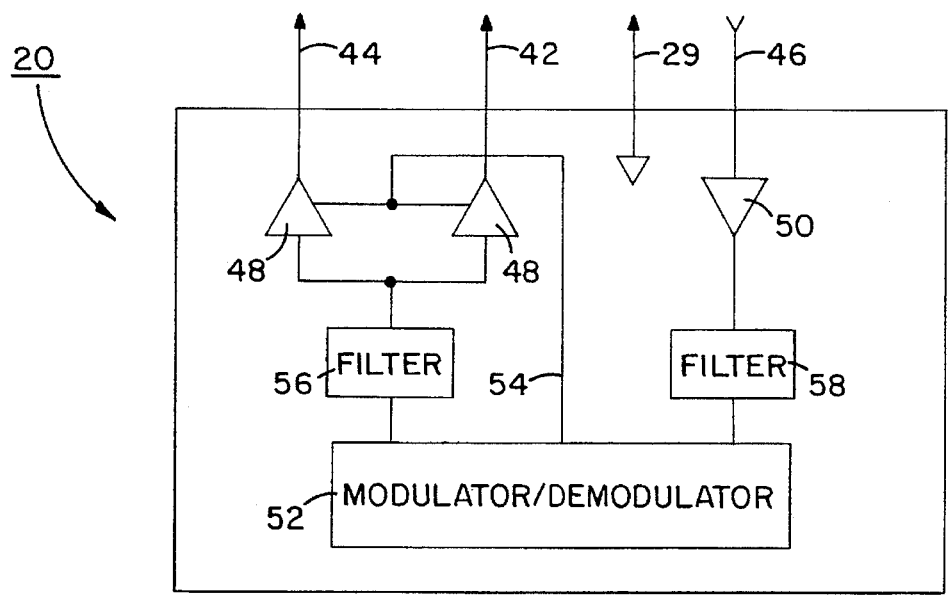
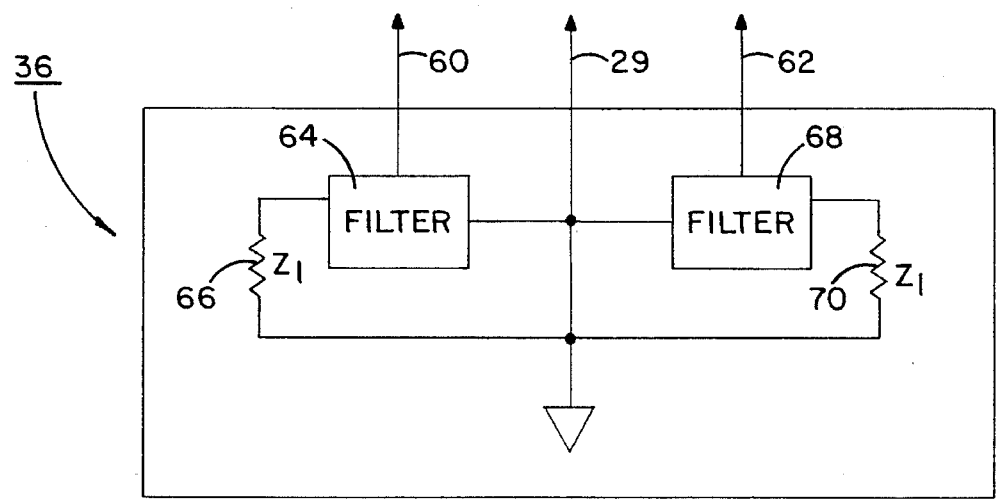
FIG. 3

STOP-BAND FILTER
MINIMUM C

SYSTEM FOR INCREASING THE CAPACITY OF EXISTING LOCAL AREA NETWORKS THAT USE SHIELDED TWISTED WIRE PAIR MEDIUM

BACKGROUND OF THE INVENTION

1. Field of the Invention

The present invention relates to the communication of data over a local area network (LAN) and, more particularly, to a system for increasing the data communication capacity of an existing LAN that uses a shielded twisted wire pair as its transmission medium.

2. Description of the Prior Art

A local area network (LAN) is a data communication system that allows a large number of sub-systems to communicate over a common data bus. Each of the subsystems is individually connected to the common data bus and a standard protocol is adopted by each sub-system so as to prevent or minimize when more than one sub-system transmits on the common data bus at the same time. Generally, each of the sub-systems transmits data on the common data bus at the same rate, or frequency.

The data communication frequency of the LAN is determined by a number of factors, one being the medium of the common data bus. One of the more popular types of media used today, due to its low cost of installation and service, is a shielded twisted wire pair. The shielded twisted wire pair allows each of the sub-systems to transmit signals differentially over the common data bus wire pair. As is commonly known, one of the most important aspects of a differential medium is its Common Mode Rejection, which allows the medium to be used in very noisy environments. Accordingly, if noise, that is analogous in both amplitude and phase, is injected into both wires of the shielded twisted wire pair, a data transmission from one of the sub-systems will not be affected by that noise. Similarly, if a signal, that is also analogous in both amplitude and phase, is injected into both wires of the shielded twisted wire pair, a data transmission from one of the sub-systems will not be affected by that signal. To date, this important aspect of the shielded twisted wire pair differential medium has not been utilized to its fullest extent.

As previously discussed, the LAN allows a large number of sub-systems to communicate over a common data bus at a specified frequency by adopting a standard protocol. However, it is often desirable or required to have these same sub-systems communicate at a higher data communication rate or by a different protocol. Since the shielded twisted wire pair provides only a single data channel with no selectivity, an additional data channel would be required to accommodate such a desire or requirement. The present invention utilizes the Common Mode Rejection of the shielded twisted wire pair differential medium to provide an additional data channel, thereby increasing the overall data communication rate and allowing a different protocol to be used by the subsystems.

SUMMARY OF THE INVENTION

The present invention contemplates a system for increasing the data communication capacity of an existing local area network (LAN) that uses a shielded twisted wire pair as its transmission medium. The data communication capacity is increased by utilizing the Common Mode Rejection of the shielded twisted wire pair differential medium to provide an additional data channel that may be used by a large number of sub-systems within the LAN without significantly adversely affecting data communications on the primary data channel. To utilize the additional data channel, each sub-system is supplied with an additional transceiver that is connected to the shielded twisted wire pair medium much the same as the primary transceiver. The shielded twisted wire pair medium is terminated by special frequency selective terminators that provide transmission line impedance matching over the bandwidth of the additional data channel, while providing a high impedance over the bandwidth of the primary data channel. Thus, differential data communications are allowed over the bandwidth of the primary data channel, while single-ended data communications are allowed over the bandwidth of the additional data channel, thereby increasing the overall data communication capacity of the LAN.

From the above descriptive summary, it is apparent how the present invention system utilizes the Common Mode Rejection aspect of the differential medium to its fullest extent.

Accordingly, the primary objective of the present invention is to provide a system for increasing the data communication capacity of an existing LAN that uses a shielded twisted wire pair as its transmission medium.

Another objective of the present invention is to provide a system for allowing different protocols to be used in an existing LAN that uses a single shielded twisted wire pair as its transmission medium.

Other objectives and advantages of the present invention will become apparent to those skilled in the art upon reading the following detailed description and claims, in conjunction with the accompanying drawings which are appended hereto.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

FIG. 2 is a schematic representation of a transceiver that is used in each subsystem of the LAN shown in FIG. 1.

FIG. 3 is a schematic representation of a frequency selective terminator that is used by the common shielded twisted wire pair transmission medium of the LAN shown in FIG. 1.

BEST MODE FOR CARRYING OUT THE PRESENT INVENTION

Figure 1:
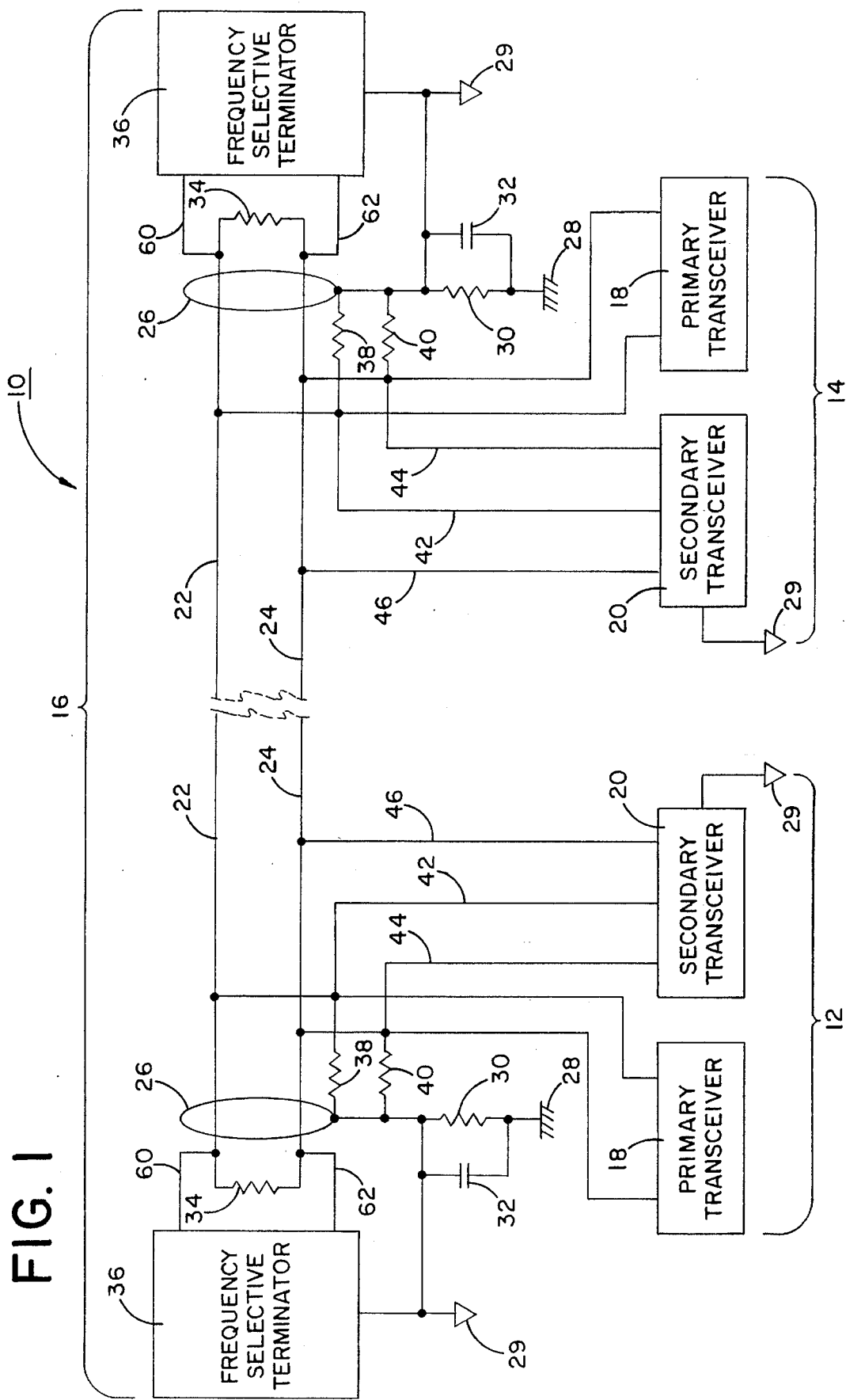
FIG. 1 is a schematic representation of local area network (LAN) having two sub-systems and a common shielded twisted wire pair transmission medium according to the present invention.

Referring to FIG. 1, there is shown a schematic representation of a local area network (LAN) 10 having a first sub-system 12, a second sub-system 14, and a common shielded twisted wire pair transmission medium 16. Each sub-system 12,14 is comprised of a primary transceiver 18 and a secondary transceiver 20 which are used to communicate over a primary data channel and a secondary data channel, respectively. The common shielded twisted wire pair transmission medium 16 is comprised of a pair of twisted wires 22,24 and a shield 26 that is connected to earth ground 28 through a resistor 30 and a capacitor 32 (RC) circuit at both its ends to reduce any noise effects from signal ground 29 on the LAN 10. A pair of high impedance resistors 38,40 are connected between the shield 26 and the pair of twisted wires 22,24, respectively, so as to balance the voltage levels on the pair of twisted wires 22,24 with respect to the shield 26. The common shielded twisted wire pair transmission medium 16 is also comprised of terminating resistors 34 and special frequency selective terminators 36 which correspond to the primary data channel and the secondary data channel, respectively. The primary data channel is a typical differential type of data communication scheme that is commonly used in LAN systems, while the secondary data channel allows single-ended data communications according to the present invention.

In the primary data channel, the primary transceivers 18 are differentially connected to the pair of twisted wires 22,24, which form a primary transmission line that is shielded by the shield 26. The primary transmission line has a characteristic impedance, $Z_0$, that is matched by the terminating resistors 34. The primary transceivers 18 contain a high input impedance receiver and a low output impedance transmitter that is fully able to drive the primary transmission line. Thus, differential data communications are allowed on the primary data channel. It should be noted that the primary transceivers 18 are isolated from signal ground 29.

In the secondary data channel, the secondary transceivers 20 have two single-ended transmitter connections 42,44 to the pair of twisted wires 22,24, respectively, and one single-ended receiver connection 46 to one of the two twisted wires 22,24. In FIG. 1, the one single-ended receiver connection 46 is made, for example, to wire 24. A secondary transmission line is formed between each of the twisted wires 22,24 and the shield 26. Referring to FIG. 2, a secondary transceiver 20 is shown in greater detail having two low output impedance transmitters 48 and one high input impedance receiver 50. The two transmitters 48 are fully able to drive the secondary transmission line. The signals transmitted by the two transmitters 48 are in phase and are of the same amplitude.

The secondary transceiver 20 also has modulator/demodulator circuitry 52 for encoding the transmit signals for the two transmitters 48 and for decoding the signals received by the receiver 50. The modulator/demodulator circuitry 52 also provides an output enable connection 54 to the two transmitters 48 so that the output impedance of the two transmitters 48 can be controlled. The output impedance of the two transmitters 48 is controlled such that a low output impedance is maintained when the two transmitters 48 are transmitting, and a high output impedance is maintained when the two transmitters 48 are inactive.

A filter 56 may be included in the secondary transceiver 20 between the modulator/demodulator circuitry 52 and the two transmitters 48 to reduce the level of any spurious signals that may be transmitted by the two transmitters 48. Additionally, a filter 58 may be included in the secondary transceiver 20 between the modulator/demodulator circuitry 52 and the receiver 50 to improve the signal to noise ratio of the received signals. It should be noted that both secondary transceivers 20 are referenced to signal ground 29.

Referring back to FIG. 1, the frequency selective terminators 36 are shown with connections 60,62 to the pair of twisted wires 22,24, respectively. Referring to FIG. 3, a frequency selective terminator 36 is shown in greater detail having a first filter 64 with a corresponding first resistor 66 having a value $Z_1$, and a second filter 68 with a corresponding second resistor 70 also having a value $Z_1$. The first filter 64 with corresponding resistor 66 and the second filter 68 with corresponding resistor 70 have identical functions, which is to provide matching for the characteristic impedance of the secondary transmission line over the signal bandwidth of the secondary data channel, while providing a high impedance over the signal bandwidth of the primary data channel. Since both filters 64,68 have identical functions, it is typical, but not required, that the two filters 64,68 are identical in composition. The characteristic impedance of the secondary transmission line is equal to $Z_1$, which can be approximated by the following equation that is found in Buchsbaum's Complete Handbook Of Practical Electronic Reference Data, 2nd Edition, 1978, p. 265, $$Z_1 = 276 \log (b/a)$$

where b is the distance between the center of either conductor in the twisted wire pair 22,24 and the shield 26, and a is the radius of either conductor in the twisted wire pair 22,24. It should be noted that both the first filter 64 and the second filter 68 are referenced to signal ground 29.

Figure 4:
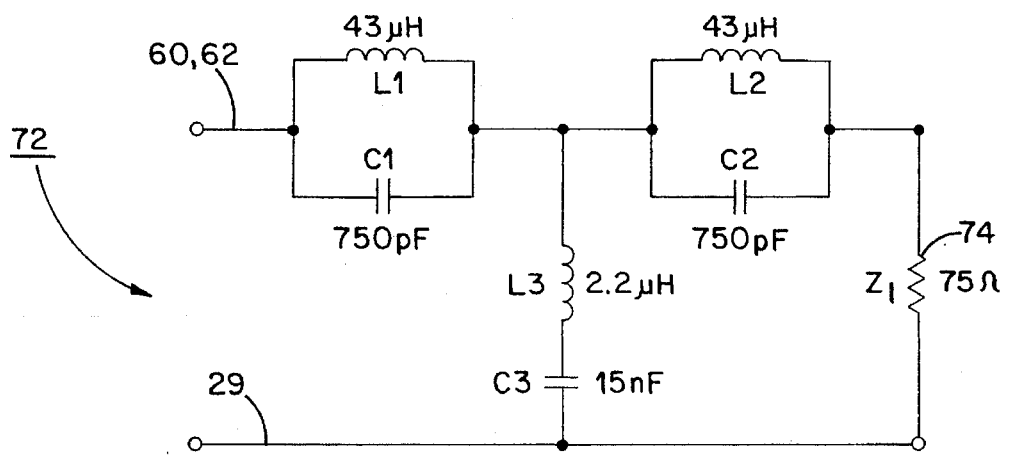
FIG. 4 is a schematic representation of a filter that is used in the frequency selective terminator shown in FIG. 3.

Referring to FIG. 4, there is shown, for example, a filter 72 with a corresponding resistor 74 which could be used as either or both the first filter 64 with the corresponding resistor 66 or the second filter 68 with the corresponding resistor 70 in the frequency selective terminator 36. Thus, the filter 72 is shown with both connections 60,62 to the pair of twisted wires 22,24, respectively, and the connection to signal ground 29. The filter 72 is designed as a stop-band filter so as to protect the signal bandwidth of the primary data channel from signals of the secondary data channel, whose signal bandwidth may be located on either side of the signal bandwidth of the primary data channel. With the signal bandwidth of the primary data channel chosen as 1.0 MHz, and operating from 0.5 MHz to 1.5 MHz, the filter component values were chosen to provide a secondary transmission line characteristic impedance, $Z_1$, of 75 Ω, and filter cutoff frequencies, $f_{c1}$ and $f_{c2}$, of 0.3 MHz and 2.0 MHz, respectively. The frequency response characteristics of the filter 72 are shown in FIG. 5.

Figure 5:
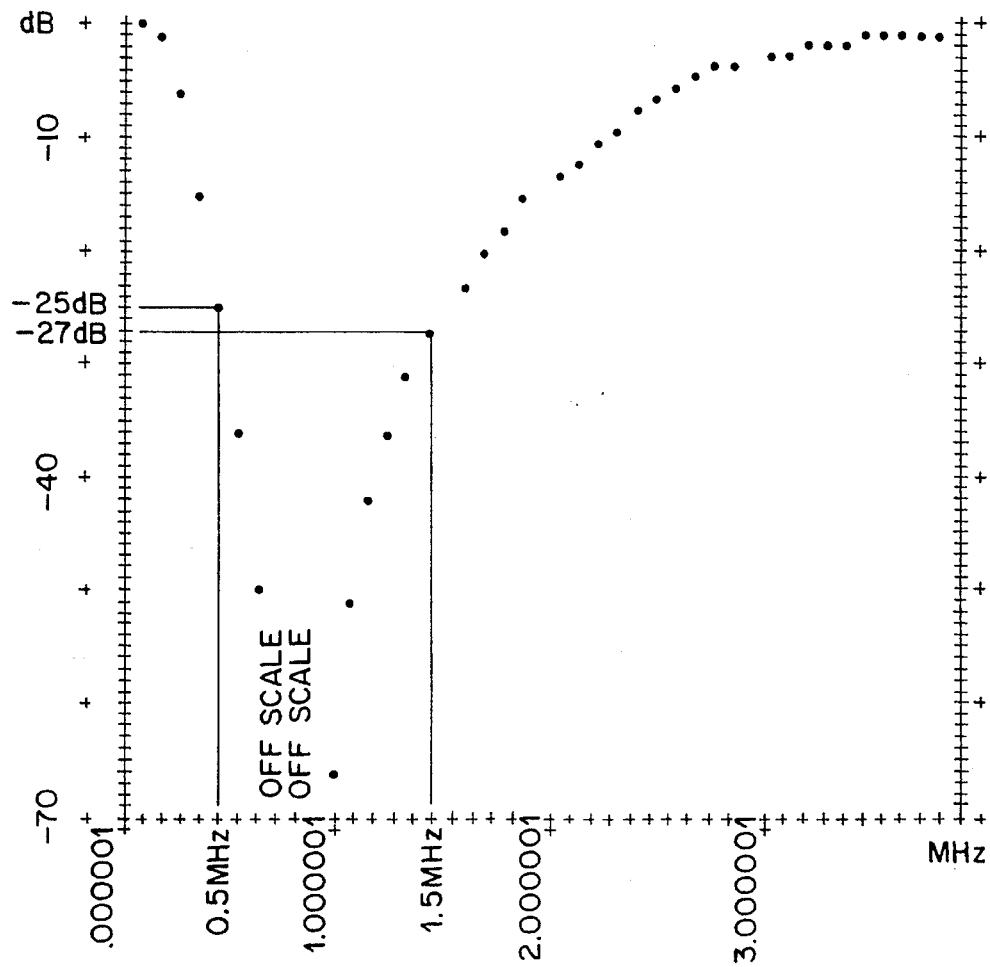
FIG. 5 is a graph showing the frequency response of the filter shown in FIG. 4.

Referring to FIG. 5, it is shown that the worst level of attenuation in the signal bandwidth of the primary data channel is 25 dB at 0.5 MHz. That is, over the signal bandwidth of the primary data channel, the maximum attenuation is 25 dB at 0.5 MHz. Assuming that this filter 72 represents both the first filter 64 and the second filter 68, and since the first filter 64 and the second filter 68 are connected in parallel across the terminating resistor 34, the total attenuation in the signal bandwidth of the primary dam channel is 50 dB, which corresponds to a voltage attenuation of 330. The shunting effect on the characteristic impedance of the primary transmission line that results from this attenuation is defined by the following equation, $$Z_0' = \frac{Z_0 \times (330 \times Z_1)}{Z_0 + (330 \times Z_1)}$$

where $Z_0'$ is the value of the characteristic impedance of the primary transmission line with the worst case voltage attenuation of 330 taken into account. With, for example, $Z_0=100$ Ω, the value of $Z_0'=99.598$ Ω, which represents a change of 0.402%. Thus, according to the present invention, single-ended data communications are allowed over the signal bandwidth of the secondary data channel at the same time as differential data communications are occurring over the signal bandwidth of the primary data channel, and the differential data communications will only suffer a worst case voltage attenuation of 0.402% due to the frequency selective terminators 36. Of course other types of filters can be designed that provide different overall results, but in any case the data communication capacity of the LAN 10 will be increased.

With the preferred embodiment of the present invention LAN 10 now fully described, it can thus be seen that the objectives set forth above are efficiently attained and, since certain changes may be made to the above-described LAN 10 without departing from the scope of the invention, it is intended that all matter contained in the above description or shown in the accompanying drawings shall be interpreted as illustrative and not in a limiting sense.

What is claimed is:

1. A system for increasing the data communication capacity of an existing local area network (LAN) that uses a shielded twisted wire pair medium having two conductors and a shield for shielding said two conductors, each said conductor and shield having two ends, said two conductors forming a primary transmission line having a first characteristic impedance for transmission of signals within a first signal bandwidth, the shielded twisted pair medium thereby supporting differential data communications at a first frequency within the first signal bandwidth, said system comprising:

a secondary transmission line formed by each of said two conductors and said shield, said secondary transmission line having a second characteristic impedance for transmission of signals within a second signal bandwidth;

first terminating means for terminating said primary transmission line at both ends with an impedance matching said first characteristic impedance;

second terminating means for selectively terminating said secondary transmission line at both ends with a high impedance over the first signal bandwidth and with an impedance matching said second characteristic impedance over the second signal bandwidth;

a plurality of primary transceivers differentially connected to said primary transmission line for providing differential data communications over said primary transmission line at a frequency within said first signal bandwidth; and a plurality of secondary transceivers single-endedly connected to said secondary transmission line for providing single-ended data communications over said secondary transmission line at a frequency within said second signal bandwidth.

2. The system as defined in claim 1, wherein said two conductors are two twisted conductors.

3. The system as defined in claim 2, wherein said shield is connected to earth ground through an RC circuit at both its ends to reduce any noise effects from signal ground on said LAN.

4. The system as defined in claim 3, wherein a high impedance resistor is connected between said shield and each of said two twisted conductors so as to balance the voltage levels on said two twisted conductors with respect to said shield.

5. The system as defined in claim 1, wherein said first terminating means is comprised of two resistors, each having a value equal to said first characteristic impedance, a first of said resistors connected across said two conductors at one end thereof and a second of said resistors connected across said two conductors at the other end thereof.

6. The system as defined in claim 1, wherein said second terminating means is comprised of:

a first filter (64) connected to a first of said two conductors at a first end thereof and to the shield at a first end thereof, a second filter (68) connected to a second of said two conductors at a first end thereof and to the shield at said first end thereof, and a resistor (66) connected to the first filter (64) and to the shield at said first ends thereof, and a resistor (70) connected to the second filter (68) and to the shield at said first ends thereof; and another first filter (64) connected to a first of said two conductors at a second end thereof and to the shield at a second end thereof, another second filter (68) connected to a second of said two conductors at a second end thereof and to the shield at said second end thereof, and another resistor (66) connected to the first filter (64) and to the shield at said second ends thereof, and a resistor (70) connected to the second filter (68) and to the shield at said second ends thereof.

7. The system as defined in claim 6, wherein each of said plurality of filters are referenced to signal ground.

8. The system as defined in claim 1, wherein each of said plurality of primary transceivers is comprised of:

a high input impedance differential receiver connected across said two conductors; and a low output impedance differential transmitter connected across said two conductors, said differential transmitter that is fully able to drive said primary transmission line.

9. The system as defined in claim 8, wherein each of said plurality of primary transceivers are isolated from signal ground.

10. The system as defined in claim 1, wherein each of said plurality of secondary transceivers is comprised of:

a high input impedance single-ended receiver connected to said shield; and two low output impedance single-ended transmitters that are fully able to drive said secondary transmission line, wherein signals transmitted by said two transmitters are in phase and are of the same amplitude, each of said single-ended transmitters having an output connected to a respective one of said two conductor.

11. The system as defined in claim 10, wherein each of said plurality of secondary transceivers further comprises modulator/demodulator circuitry for encoding transmit signals for said two transmitters and for decoding signals received by said receiver.

12. The system as defined in claim 11, wherein each of said plurality of secondary transceivers further comprises:

a filter located between said modulator/demodulator circuitry and said two transmitters for reducing the level of any spurious signals that may be transmitted by said two transmitters, and a filter located between said modulator/demodulator circuitry and said receiver for improving the signal to noise ratio of signals received by said receiver.

13. The system as defined in claim 12, wherein each of said plurality of secondary transceivers is referenced to signal ground.

14. A method for increasing the data communication capacity of an existing local area network (LAN) that uses a shielded twisted wire pair medium having two conductors and a shield for shielding said two conductors, each said conductor and shield having two ends, said two conductors forming a primary transmission line having a first characteristic impedance for transmission of signals within a first signal bandwidth, the shielded twisted pair medium thereby supporting differential data communications at a first frequency within the first signal bandwidth, said method comprising the steps of:

forming a secondary transmission line from said two conductors and said shield in said transmission medium, said secondary transmission line having a second characteristic impedance for transmission of signals within a second signal bandwidth;

terminating said primary transmission line at both ends with a first terminating means that matches said first characteristic impedance;

selectively terminating said secondary transmission line at both ends with a second terminating means that provides a high impedance over the first signal bandwidth and an impedance matching said second characteristic impedance over the second signal bandwidth;

differentially connecting a plurality of primary transceivers to said primary transmission line for providing differential data communications over said primary transmission line at a frequency within said first signal bandwidth; and single-endedly connecting a plurality of secondary transceivers to said secondary transmission line for providing single-ended data communications over said secondary transmission line at a frequency within said second signal bandwidth.

15. The method as defined in claim 14, further comprising the step of connecting said shield to earth ground through an RC circuit at both ends of the shield so as to reduce any noise effects from signal ground on said LAN.

16. The method as defined in claim 14, further comprising the step of connecting said shield to each said conductor through a high impedance resistor at each end of the conductors and the shield so as to balance the voltage levels on each said conductor with respect to said shield.

* * * * *

UNITED STATES PATENT AND TRADEMARK OFFICE
CERTIFICATE OF CORRECTION

PATENT NO. : 5,517,487
DATED : May 14, 1996
INVENTOR(S) : Anatoly V. Fridland, John J. Finnegan
David J. Holigan It is certified that error appears in the above-identified patent and that said Letters Patent is hereby corrected as shown below:

In Column 4, line 53, "dam" should be --data--

Signed and Sealed this

Twenty-third Day of September, 1997

Attest:

BRUCE LEHMAN

*Attesting Officer*     *Commissioner of Patents and Trademarks*